(12) United States Patent
Simonot et al.

(10) Patent No.: US 7,256,233 B2
(45) Date of Patent: Aug. 14, 2007

(54) TIRE RUBBER COMPOSITION BASED ON A REINFORCING ALUMINOSILICATE

(75) Inventors: Laure Simonot, Greenville, SC (US); Anne Veyland, Marsat (FR); Arnaud Lapra, Clermont-Ferrand (FR); Emmanuel Custodero, Chamalieres (FR)

(73) Assignee: Michelin Recherche et Technique S.A., Granges-Baccot (CH)

( * ) Notice: Subject to any disclaimer, the term of this patent is extended or adjusted under 35 U.S.C. 154(b) by 61 days.

(21) Appl. No.: 11/155,507

(22) Filed: Jun. 20, 2005

(65) Prior Publication Data

US 2006/0009564 A1  Jan. 12, 2006

Related U.S. Application Data

(63) Continuation of application No. PCT/EP03/13945, filed on Dec. 9, 2003.

(30) Foreign Application Priority Data

Dec. 19, 2002  (FR) .................................. 02 16444

(51) Int. Cl.
*C08K 3/34* (2006.01)
(52) U.S. Cl. .................... 524/444; 524/450; 524/437; 524/438; 524/436; 524/492; 524/571; 524/575; 152/209.1
(58) Field of Classification Search ................ 524/444, 524/450, 436, 437, 492, 438, 571, 575; 152/209.1
See application file for complete search history.

(56) References Cited

U.S. PATENT DOCUMENTS

| | | | | |
|---|---|---|---|---|
| 3,036,980 A | * | 5/1962 | Dunham, Jr. et al. ........ | 523/211 |
| 3,832,327 A |   | 8/1974 | Hackbarth et al. | |
| 3,878,147 A | * | 4/1975 | Craven ........................ | 523/150 |
| 4,072,796 A | * | 2/1978 | Reinhardt et al. .......... | 428/405 |
| 4,133,797 A | * | 1/1979 | Tirpak et al. ................ | 523/134 |
| 4,420,582 A | * | 12/1983 | Canard et al. ............... | 524/450 |
| 4,612,342 A | * | 9/1986 | Kostinko .................... | 524/450 |
| 4,968,728 A | * | 11/1990 | Wason ......................... | 523/216 |
| 5,013,783 A | * | 5/1991 | Thormer et al. ............. | 524/450 |
| 5,413,789 A | * | 5/1995 | Hagiwara et al. ........... | 424/409 |
| 5,475,051 A | * | 12/1995 | Machurat .................... | 524/519 |
| 5,674,932 A | * | 10/1997 | Agostini et al. ............. | 524/430 |
| 6,489,389 B1 | * | 12/2002 | Ohta et al. ................... | 524/437 |
| 6,548,570 B1 | * | 4/2003 | Lange ......................... | 523/137 |

FOREIGN PATENT DOCUMENTS

| | | | |
|---|---|---|---|
| DE | 41 35 355 A1 | * | 4/1993 |
| DE | 42 14 909 A1 | * | 11/1993 |
| DE | 199 55 192 A1 | * | 5/2001 |
| EP | 0 697 432 A1 | | 2/1996 |
| EP | 1 148 085 A2 | * | 10/2001 |
| FR | 1498 500 | * | 8/1966 |
| JP | 10-7875 | * | 1/1998 |
| WO | 99/28376 | | 6/1999 |

OTHER PUBLICATIONS

JP 10-7875 (Jan. 1998; abstract and translation in English).*
KR 2001-60483 (Korea, Jul. 2001; C08L 55/02); abstract only.*
Vulkasil A1, Lanxess product data sheet, Dec. 14, 2004.*

* cited by examiner

*Primary Examiner*—David W. Wu
*Assistant Examiner*—Rip A. Lee
(74) *Attorney, Agent, or Firm*—Buchanan Ingersoll & Rooney PC

(57) ABSTRACT

A rubber composition usable for the manufacture of tires, based on at least one diene elastomer, one reinforcing inorganic filler and a coupling agent providing the bond between the inorganic filler and the elastomer. The inorganic filler comprises a synthetic aluminosilicate of the formula:

$$M_xSiAl_yO_a(OH)_b, (H_2O)_c \qquad (I)$$

in which:
  M is a cation selected from of $K^+$, $Na^+$, $Ca^{++}$ and mixtures of these cations;
  $x>0$; $y>0$; $a \geq 0$; $b \geq 0$; $c \geq 0$ and $a+b>0$,
and having the following characteristics:
(a) a BET specific surface area of between 20 and 300 $m^2/g$;
(b) an average particle size by mass ($d_w$) of between 20 and 400 nm; and
(c) an ultrasound disagglomeration rate ($\alpha$) greater than $5 \times 10^{-4}$ $\mu m^{-1}$/min.

18 Claims, 1 Drawing Sheet

TIRE RUBBER COMPOSITION BASED ON A REINFORCING ALUMINOSILICATE

CROSS-REFERENCE TO RELATED APPLICATIONS

The present application is a continuation of PCT Application No. PCT/EP2003/013945, filed Dec. 9, 2003, published in French on Jul. 8, 2004, as WO 2004/056915 A1, which claims priority of French Application No. 02/16444, filed Dec. 19, 2002, the entire contents of both applications being incorporated herein in their entirety.

BACKGROUND

1. Field of the Invention

The present invention relates to diene rubber compositions usable for the manufacture of tires or semi-finished products for tires, in particular of treads for these tires, and to the reinforcing inorganic fillers capable of reinforcing such rubber compositions.

2. Description of Related Art

So as to reduce fuel consumption and the pollution emitted by motor vehicles, major attempts have been made by tire designers to obtain tires having all of the following: very low rolling resistance, improved adhesion both on dry ground and on wet or snow-covered ground, and good wear resistance.

Numerous solutions have in particular been proposed in the past for lowering the rolling resistance and improving the grip of tires, but these generally result in very significant decline of the wear resistance.

In particular, it is well known that although the incorporation of conventional white fillers such as, for example, conventional silicas or aluminas, chalk, talc, natural aluminosilicates such as bentonite or kaolin, in rubber compositions used for the manufacture of tires and in particular of treads, does result in a reduction in the rolling resistance and an improvement in adhesion to wet, snow-covered or icy ground, it also results in an unacceptable decline in the wear resistance, linked to the fact that these conventional white fillers do not have a sufficient reinforcement ability with respect to such rubber compositions.

For this reason, these white fillers are generally referred to as non-reinforcing fillers, also referred to as inert fillers.

One effective solution to this problem of insufficient wear resistance has been found due to the recent development, in the last ten years, of new rubber compositions comprising truly reinforcing inorganic fillers, in particular highly dispersible silicas referred to as "HDS" (for "Highly Dispersible Silica"), which have proved capable of replacing conventional carbon blacks for tires (see for example patents or patent applications EP 501 227, EP 692 492, EP 692 493, EP 735 088, EP 810 258, WO99/02590, WO99/02602, WO99/28376, WO 01/96442, WO 02/30939, WO 02/31041 and WO 02/083782).

The compositions based on HDS silica however have the known drawback of having very substantially slower vulcanization kinetics, as a general rule slower by a factor of two to three, compared with conventional compositions filled with carbon black. It is known that the longer curing times which result adversely affect the industrial processing of tires or treads for tires based on such compositions.

SUMMARY OF THE INVENTION

Now, the Applicants have discovered during their research that there are other types of reinforcing inorganic filler, in this case specific aluminosilicates of synthetic type, which may also be used in rubber compositions as true reinforcing fillers, that is to say ones which are capable of replacing conventional carbon blacks for tires such as HDS silicas.

Unexpectedly, these specific synthetic aluminosilicates offer not only an excellent reinforcement ability to the rubber compositions containing them, owing to a high dispersion ability, close to that accessible with HDS-type silicas, but also improved vulcanization kinetics compared with the use of such silicas.

Consequently, a first subject of the invention relates to a rubber composition based on at least (i) one diene elastomer, (ii) one reinforcing inorganic filler, (iii) a coupling agent providing the bond between the reinforcing filler and the elastomer, characterized in that said inorganic filler comprises a synthetic synthesized aluminosilicate (hereafter referred to as "reinforcing aluminosilicate") of the formula:

$$M_x SiAl_y O_a(OH)_b, (H_2O)_c \quad (I)$$

where:
M is a cation selected from among the group consisting of $K^+$, $Na^+$, $Ca^{++}$ and mixtures of these cations;
$x>0$; $y>0$; $a \geq 0$; $b \geq 0$; $c \geq 0$ and $a+b>0$;

and having the following characteristics:
(a) a BET specific surface area of between 20 and 300 $m^2/g$;
(b) an average particle size by mass ($d_w$) of between 20 and 400 nm;
(c) an ultrasound disagglomeration rate ($\alpha$) greater than $5 \times 10^{-4}$ $\mu m^{-1}$/min.

The subject of the invention is also a process for obtaining a rubber composition having improved vulcanization kinetics, usable for the manufacture of tires, in which there are incorporated in at least one diene elastomer, at least one reinforcing inorganic filler and a coupling agent providing the bond between the reinforcing inorganic filler and the elastomer, this process being characterized in that said inorganic filler comprises a reinforcing aluminosilicate (i.e., having all the aforementioned characteristics), and in that the entire mixture is kneaded thermomechanically, in one or more stages, until a maximum temperature of between 110° C. and 190° C. is reached.

Another subject of the invention is the use of a composition according to the invention for the manufacture of finished articles or semi-finished products, and also these finished articles and semi-finished products themselves, comprising a rubber composition according to the invention, these articles or products being intended for any ground contact system for automobiles, such as tires, internal safety supports for tires, wheels, rubber springs, elastomeric joints and other suspension and anti-vibration elements.

A very particular subject of the invention is the use of a rubber composition according to the invention for the manufacture of tires or semi-finished rubber products intended for these tires, these semi-finished products being selected in particular from the group comprising treads, underlayers intended for example to be positioned beneath these treads, crown plies, sidewalls, carcass plies, beads, protectors, inner tubes and airtight internal rubbers for tubeless tires.

The composition according to the invention is particularly suited to the manufacture of treads for tires intended to be fitted on passenger vehicles, vans, 4×4 vehicles (having 4 driving wheels), two-wheeled vehicles, "heavy vehicles" (that is to say subway trains, buses, road transport machinery (lorries, tractors, trailers), off-road vehicles), aircraft, construction, agricultural or handling machinery, these treads being able to be used in the manufacture of new tires or for retreading worn tires.

Reduced curing times are in particular advantageous for treads intended for retreading, be it "cold" retreading (use of a precured tread) or conventional "hot" retreading (use of a tread in the uncured state). In this latter case, a reduced curing time, in addition to the fact that it reduces the production costs, limits the overcuring (or post-curing) imposed on the rest of the tire (carcass) of the worn tire (already vulcanized).

The subject of the invention is also these tires and these semi-finished rubber products themselves, in particular these treads, when they comprise a rubber composition according to the invention.

Another subject of the invention is the use, as reinforcing filler, of a reinforcing aluminosilicate as defined above in a diene rubber composition.

The invention and its advantages will be readily understood in the light of the description and examples of embodiment which follow, and of the figures relating to these examples, which show curves of the variation of modulus as a function of elongation for different diene rubber compositions, whether or not in accordance with the invention.

BRIEF DESCRIPTION OF DRAWING FIGURES

DETAILED DESCRIPTION OF THE PREFERRED EMBODIMENTS

I. Measurements and Tests Used

I-1. Characterization of the Reinforcing Fillers

Figure 1:
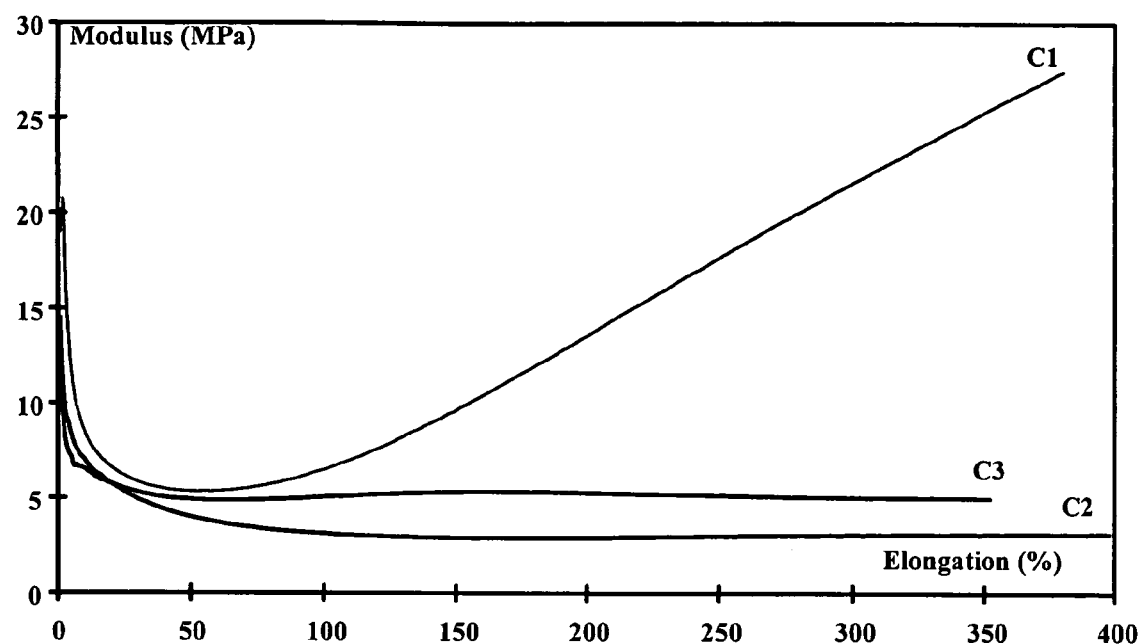
FIG. 1 is a graph showing three curves of true secant modulus "M" as a function of elongation for rubber compositions C-1 to C-3.

The fillers described hereafter consist in known manner of agglomerates of particles, which are liable to disagglomerate into these particles under the effect of an external force, for example under the action of mechanical working or ultrasound. The term "particle" used in the present application must be understood in its usual generic sense of "aggregate" (also referred to as "secondary particle"), and not in that of an "elementary particle" (also referred to as "primary particle") which may form, if applicable, part of this aggregate; "aggregate" is to be understood, in known manner, to mean the non-splittable unit (i.e. which cannot be cut or divided) generally formed of elementary (primary) particles which are aggregated together, produced during synthesis of the filler.

These fillers are characterized as indicated hereafter.

a) BET Specific Surface Area:

The BET specific surface area is determined by adsorption of gas using the method of Brunauer-Emmett-Teller described in "*The Journal of the American Chemical Society*" Vol. 60, page 309, February 1938, more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17].

b) Average Particle Size $d_w$:

The average size (by mass) of the particles, $d_w$, is measured in known manner after ultrasound dispersion of the filler to be analysed. Measurement takes place using a centrifugal X-ray detection sedimentometer type "XDC" ("X-Ray Disk Centrifuge"), sold by Brookhaven Instruments.

The operating method is as follows. A suspension is produced of 3.2 g of sample of filler to be analysed in 40 ml of water, by action over 8 minutes, at 60% power (60% of the maximum position of the "output control"), of a 1500 W ultrasound probe (Vibracell ¾-inch ultrasound generator sold by Bioblock under the reference M75450). To limit heating during ultrasound generation, the suspension is preferably placed in a bath of cold water (for example at a temperature of 5 to 10° C.). After ultrasound generation, 15 ml of the suspension is introduced into the rotating disc; after sedimentation for 120 minutes. The mass distribution of the particle sizes is calculated by the software of the "XDC" sedimentometer; the weight geometric mean of the particle sizes ("geometric mean (Xg)" is what the software refers to), here $d_w$, is calculated by the software from the following equation:

$$\log d_w = \frac{\sum_{i=1}^{n} m_i \log d_i}{\sum_{i=1}^{n} m_i}$$

with $m_i$=mass of all the objects in the class of diameter $d_i$. For particles (not in accordance with the invention) the size $d_w$ of which is very great (beyond 1 μm), the measurements are performed "by gravitation", that is to say that the speed of rotation of the disc is zero.

c) Disagglomeration Rate α:

The disagglomeration rate (α) is measured in what is called the "ultrasound disagglomeration test", at 100% power of a 600-W (watt) probe, operating here in pulse mode (namely 1 second "ON", 1 second "OFF") to avoid excessive heating of the ultrasound probe during measurement. This known test, which is the subject in particular of patent application WO99/28376 (see also WO99/28380, WO00/73372, WO00/73373), makes it possible to measure continuously the change in the average size (by volume) of the agglomerates of particles during ultrasound generation, in accordance with the specifications hereafter.

The setup used consists of a laser granulometer (type "Mastersizer S", sold by Malvern Instruments —He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600-watt ½ inch ultrasound generator type Vibracell sold by Bioblock).

A small quantity (120 mg) of filler to be analysed is introduced into the preparer with 160 ml of water, the rate of circulation being set to its maximum. At least three consecutive measurements are taken to determine the initial mean diameter (by volume) of the agglomerates, referred to as $d_v[0]$, in accordance with the known Fraunhofer calculation method (Malvern 3$$D calculation matrix). The ultrasound generation (pulse mode: 1 sec ON, 1 sec OFF) is then established at a power of 100% (namely 100% of the maximum position of the "tip amplitude") and the change in the mean diameter by volume $d_v[t]$ as a function of the time "t" is monitored for about 8 minutes with one measurement approximately every 10 seconds. After an induction period (about 3-4 minutes), it is noted that the reciprocal of the mean diameter by volume $1/d_v[t]$ varies linearly, or substantially linearly, with the time "t" (stable disagglomeration conditions). The disagglomeration rate α is calculated by linear regression of the curve of evolution of $1/d_v[t]$ as a function of the time "t", within the zone of stable disagglomeration conditions (generally, between about 4 and 8 minutes). It is expressed in $\mu m^{-1}/min$.

The aforementioned application WO99/28376 describes in detail a measuring device usable for performing this ultrasound disagglomeration test. It will be recalled that this device consists of a closed circuit within which a flow of agglomerates of particles suspended in a liquid can circulate. This device essentially comprises a sample preparer, a laser granulometer and a treatment cell. A vent to atmospheric pressure, at the level of the sample preparer and of the treatment cell itself, permits continuous elimination of the air bubbles which form during ultrasound generation (action of the ultrasonic probe).

The sample preparer ("Malvern Small Sample Unit MSX1") is intended to receive the sample of silica to be tested (in suspension in the liquid 3) and to send it through the circuit at the pre-controlled speed (potentiometer—maximum speed of approximately 3 1/min), in the form of a flow of liquid suspension. This preparer consists simply of a receiving tank which contains, and through which circulates, the suspension to be analysed. It is equipped with a stirrer motor of variable speed in order to prevent sedimentation of the agglomerates of particles of the suspension; a centrifugal mini-pump is intended to circulate the suspension in the circuit; the entrance to the preparer is connected to the open air via an opening intended to receive the sample of filler to be tested and/or the liquid used for the suspension.

To the preparer there is connected a laser granulometer ("Mastersizer S"), the role of which is to measure continuously, at regular intervals, the average size by volume "$d_v$" of the agglomerates as the flow passes, by means of a measuring cell to which are coupled the automatic recording and calculation means of the granulometer. It should be recalled here briefly that laser granulometers utilise, in known manner, the principle of diffraction of the light by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of light diffracted for different angles of diffraction to be able to determine the size distribution (by volume) of the sample, $d_v$ corresponding to the average size by volume of this distribution ($d_v=\Sigma(n_id_i^4)/\Sigma(n_id_i^3)$ with $n_i$ being the number of objects of the size class or diameter $d_i$.

Inserted between the preparer and the laser granulometer there is, finally, a processing cell equipped with an ultrasonic probe, capable of operating in continuous or pulse mode, intended continuously to break up the agglomerates of particles as the flow passes. This flow is thermostatically controlled by means of a cooling circuit arranged, at the level of the cell, in a double casing surrounding the probe, the temperature being controlled, for example, by a heat sensor immersed in the liquid at the level of the preparer.

d) NMR Analysis:

For analysis of the chemical shifts by silicon NMR, in an aluminosilicate environment, reference will be made for example to the publication "*Structural Studies of Silicates by Solid-State High Resolution $^{29}Si$ NMR*", E. Lippmaa et al., J. Am. Chem. Soc., 1980, 102, 4889-4893.

The NMR spectra are obtained in known manner, on a BRUKER ASX 200 MHz spectrometer, fitted with a 4.7-Tesla superconductive magnet (Larmor frequency of the silicon=39.76 MHz). To acquire the signal, the samples in powder form are placed in a cylindrical zirconium oxide sample holder (rotor) of approximately 0.3 $cm^3$, which rotates at the magic angle at a frequency of 4 KHz. During the observation of the signal, high-power decoupling is used to average the dipolar proton-silicon interactions; the number of "scans" is of between 10 and 15 thousand, in order to increase the sensitivity of the measurement.

I-2. Characterization of the Rubber Compositions

The rubber compositions are characterized, before and after curing, as indicated below.

a) Tensile Tests:

These tests make it possible to determine the elasticity stresses and the properties at break. Unless indicated otherwise, they are effected in accordance with French Standard NF T 46-002 of September 1988. The true secant moduli (i.e. calculated reduced to the real section of the test piece), expressed in MPa, at 10% elongation (moduli therefore marked M10 and E10, respectively), 100% elongation (moduli marked M100 and E100, respectively) and 250% or 300% elongation (moduli marked M250 or M300 and E250 or E300, respectively, according to the case), are measured either in a first elongation (i.e. without an accommodation cycle—the moduli are then marked "M") or in a third elongation (i.e. after two accommodation cycles—the moduli are then marked "E").

The breaking stresses (in MPa) and the elongations at break (in %) may also be measured. All these tensile measurements are effected under normal conditions of temperature and humidity (23±2° C.; 50±5% relative humidity—French Standard NF T 40-101 of December 1979).

Processing the tensile data recorded also makes it possible to plot the curve of the modulus as a function of the elongation (see attached FIGS. 1 and 2), the modulus used here being the true secant modulus measured in a first elongation (modulus referred to as "M").

b) Dynamic Properties:

The dynamic properties are measured on a viscoanalyser (Metravib VA4000), in accordance with ASTM Standard D5992-96. The response of a sample of vulcanized composition (cylindrical test piece of a thickness of 4 mm and a section of 400 $mm^2$), subjected to an alternating single sinusoidal shearing stress, at a frequency of 10 Hz, at a temperature of 100° C., is recorded. Scanning is effected at an amplitude of deformation of 0.1 to 50% (outward cycle), then of 50% to 1% (return cycle); for the return cycle, the maximum value of the loss factor, $\tan(\delta)_{max}$, is recorded.

c) "Bound Rubber" Test":

The so-called "bound rubber" test makes it possible to determine the proportion of elastomer, in a non-vulcanized composition, which is associated so intimately with the reinforcing filler that this proportion of elastomer is insoluble in the usual organic solvents. Knowledge of this insoluble proportion of rubber, bound with the reinforcing filler during mixing, gives a quantitative indication of the reinforcing activity of the filler in the rubber composition.

Such a method has been described, for example, in French Standard NF T 45-114 (June 1989) applied to the determination of the amount of elastomer bound to the carbon black.

This test, which is well-known to the person skilled in the art for characterising the quality of reinforcement provided by the reinforcing filler, has been described, for example, in the following documents: *Plastics, Rubber and Composites Processing and Applications*, Vol. 25, No. 7, p. 327 (1996); *Rubber Chemistry and Technology*, Vol. 69, p. 325 (1996).

In the present case, the amount of elastomer which cannot be extracted with toluene is measured, after swelling for 15 days of a sample of rubber composition (typically 300-350 mg) in this solvent (for example in 80-100 cm$^3$ of toluene), followed by a 24-hour drying step at 100° C., in a vacuum, before weighing the sample of rubber composition thus treated. Preferably, the above swelling step is carried out at ambient temperature (approximately 20° C.) and protected from light, and the solvent (toluene) is changed once, for example after the first five days' swelling. The amount of "bound rubber" (% by weight) is calculated in known manner by the difference between the initial weight and the final weight of the sample of rubber composition, after making allowance for and eliminating, in the calculation, the fraction of the components which are insoluble by nature, other than the elastomer, which are initially present in the rubber composition.

d) Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983). $T_\alpha$ (for example $T_{99}$) is the time necessary to achieve a conversion of $\alpha$ %, that is to say $\alpha$ % (for example 99%) of the deviation between the minimum and maximum torques. The conversion rate constant K (in min$^{-1}$) of order 1, calculated between 30% and 80% conversion, is also measured, which makes it possible to assess the vulcanization kinetics (the higher K is, the faster are the kinetics).

II. Conditions of Implementation of the Invention

The rubber compositions according to the invention are based on the following constituents: (i) (at least) one diene elastomer, (ii) (at least) one reinforcing inorganic filler and (iii) (at least) a coupling agent providing the bond between this filler and this diene elastomer, said inorganic filler comprising a reinforcing aluminosilicate as described in detail hereafter.

Of course, the expression "composition based on" is to be understood to mean a composition comprising the mix and/or the product of reaction in situ of the different base constituents used, some of these base constituents being able to and/or being intended to react together, at least in part, during the different phases of manufacture of the composition, or during the later curing thereof.

In the present description, unless expressly indicated otherwise, all the percentages (%) indicated are mass %.

II-1. Diene Elastomer

"Diene" elastomer or rubber is understood in known manner to mean an elastomer originating at least in part (i.e. a homopolymer or a copolymer) from diene monomers, that is to say monomers bearing two double carbon-carbon bonds, whether conjugated or not.

"Essentially unsaturated" diene elastomer is understood here to mean a diene elastomer resulting at least in part from conjugated diene monomers, having a content of members or units of diene origin (conjugated dienes) which is greater than 15% (mol %). Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15% (mole %).

Within the category of "essentially unsaturated" diene elastomers, "highly unsaturated" diene elastomer is understood to mean in particular a diene elastomer having a content of units of diene origin (conjugated dienes) which is greater than 50% (mole %).

These definitions being given, the following are understood in particular to be meant by diene elastomer capable of being used in the compositions according to the invention:

(a)—any homopolymer obtained by polymerization of a conjugated diene monomer having 4 to 12 carbon atoms;

(b)—any copolymer obtained by copolymerization of one or more dienes conjugated together or with one or more vinyl-aromatic compounds having 8 to 20 carbon atoms;

(c)—any ternary copolymer obtained by copolymerization of ethylene, of an □-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—any copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and from 1% to 80% by weight of vinyl-aromatic units. The elastomers may have any microstructure, which is a function of the polymerization conditions used, in particular of the presence or absence of a modifying and/or randomising agent and the quantities of modifying and/or randomising agent used. The elastomers may for example be block, random, sequential or microsequential elastomers, and may be prepared in a dispersion or in solution; they may be coupled and/or starred or alternatively functionalized with a coupling and/or starring or functionalizing agent.

Preferred are polybutadienes, and in particular those having a content of 1,2-units of between 4% and 80%, or those having a content of cis-1,4 of more than 80%, polyisoprenes, butadiene/styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature ("Tg"—measured in accordance with ASTM Standard D3418-82) of between −40° C. and −80° C., isoprene/styrene copolymers and in particular those having a styrene content of between 5% and 50% by weight and a Tg of between −25° C. and −50° C.

In the case of butadiene/styrene/isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

According to a preferred embodiment of the invention, the diene elastomer of the composition according to the invention is selected from the group of highly unsaturated diene elastomers which consists of polybutadienes (BR), synthetic polyisoprenes (IR), natural rubber (NR), butadiene/styrene copolymers (SBR), butadiene/isoprene copolymers (BIR), butadiene/acrylonitrile copolymers (NBR), isoprene/styrene copolymers (SIR), butadiene/styrene/isoprene copolymers (SBIR), and mixtures of these elastomers.

The composition according to the invention is in particular intended for a tread for a tire, be it a new or a used tire (case of retreading).

When such a tread is intended for example for a passenger-car tire, the diene elastomer is preferably an SBR or an SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used, this SBR copolymer, which is preferably prepared in solution (SSBR), possibly being used in a mixture with a polybutadiene (BR) having preferably more than 90% cis-1,4 bonds.

When the tread is intended for a utility tire such as a heavy-vehicle tire, the diene elastomer is preferably an isoprene elastomer. "Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). The isoprene elastomer is preferably natural rubber or a synthetic polyisoprene of the cis-1,4 type. Of these synthetic polyisoprenes, preferably polyisoprenes having a content (mole %) of cis-1,4 bonds greater than 90%, more preferably still greater than 98%, are used. Of course, the diene elastomer may also be formed, in part, of another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

II-2. Reinforcing Inorganic Filler

In the present application, "reinforcing inorganic filler", in known manner, is understood to mean an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

The synthetic aluminosilicate used as reinforcing inorganic filler may constitute all or only part of the total reinforcing filler, in the latter case associated, for example, with another reinforcing inorganic filler such as an HDS silica, or with conventional carbon black.

Preferably, the reinforcing aluminosilicate constitutes the majority, that is to say more than 50% by weight, of the total reinforcing filler (i.e. of the total inorganic reinforcing filler in the absence of carbon black). Advantageously, the reinforcing aluminosilicate may constitute the entire reinforcing (inorganic) filler.

This being specified, the composition according to the invention uses, as reinforcing inorganic filler, a synthetic aluminosilicate, referred to as "reinforcing aluminosilicate", of formula (I) below:

$$M_xSiAl_yO_a(OH)_b, (H_2O)_c \qquad (I)$$

where:
M is a cation selected from among the group consisting of K$^+$, Na$^+$, Ca$^{++}$ and mixtures of these cations;
x>0; y>0; a≧0; b≧0, c≧0 and a+b>0;

and having the following characteristics:
(a) a BET specific surface area of between 20 and 300 m$^2$/g;
(b) an average particle size by mass (d$_w$) of between 20 and 400 nm;
(c) an ultrasound disagglomeration rate (α) greater than 5×10$^4$ μm$^{-1}$/min.

"Aluminosilicate" is understood to mean any compound corresponding, apart from any impurities, to formula (I) above, whatever its form, whether crystalline or amorphous.

A synthetic aluminosilicate must not be confused with silicon oxides such as silica (SiO$_2$) nor with aluminium oxides such as aluminas or aluminium oxide-hydroxides, as described for example in the aforementioned applications EP-A-0 501 227, EP-A-0 735 088, EP-A-0 810 258 and WO99/28376.

First of all, a synthetic aluminosilicate is characterized by the simultaneous presence, in one and the same particle, of the elements Al and Si, which is not the case for silicas or aluminas, nor for mixtures of aluminas and silicas. Under a transmission electron microscope, for example, silicon and aluminium atoms will always be visible in one and the same aggregate of aluminosilicate, which is not the case for silicas, aluminas or mixtures of these two types of filler.

A synthetic aluminosilicate, obtained in known manner by co-precipitation of silicon and aluminium, is furthermore characterized by the widespread presence in its structure of Al—O—Si bonds. This structure is easily identifiable by NMR analysis (see section I-1.d above), which distinguishes it for example easily from a silica SiO2 which would be simply doped with aluminium (aforementioned EP-A-0 735 088).

NMR analysis on such an aluminosilicate shows that for the majority of the Si atoms, there is at least one atom of Al linked to these atoms of Si by means of an Al—O—Si bond. The synthesized reinforcing aluminosilicates in the following examples of embodiment are generally characterized by a number of Al—O—Si bonds within a range from 1 to 4, for a given Si atom.

The cation M used is preferably Na$^+$: it has been noted that such a cation was synonymous of a higher disagglomeration rate.

The BET specific surface area of the reinforcing aluminosilicate is of between 20 and 300 m$^2$/g, or between 40 and 200 m$^2$/cm$^3$ approximately, more precisely between 42 and 1191 m$^2$/cm$^3$ for a range of density varying between 2.10 g/cm$^3$ (density of the silica SiO$_2$) and 3.97 g/cm$^3$ (density of the alumina Al$_2$O$_3$).

For a BET surface area of less than 20 m$^2$/g (or approximately 40 m$^2$/cm$^3$ for the minimum density considered above), the compositions admittedly have an easier processing ability in the uncured state ("processability") and a reduced hysteresis, but a degeneration in the reinforcement properties and a wear resistance, in the tire, which decreases are observed; for BET surface areas greater than 300 m$^2$/g (or approximately 1200 m$^2$/cm$^3$ for the maximum density indicated above), the processability in the uncured state is reduced (higher Mooney plasticity) and the dispersion of the filler is adversely affected as a result. For excessively large sizes d$_w$, greater than 400 nm, the particles act like defects which localise stresses and are harmful in terms of wear; sizes d$_w$ which are too small, less than 20 nm, on the other hand, will impair the processability in the uncured state and the dispersion of the filler during this processing.

For all the reasons set forth above, the BET surface area is preferably between 40 and 250 m$^2$/g (or approximately between 85 and 1000 m$^2$/cm$^3$ for the density range indicated above) and the particle size d$_w$ is preferably between 50 and 300 nm.

The intrinsic dispersibility of a filler can be evaluated using the ultrasound disagglomeration test described in Section I above, by measuring the disagglomeration rate of this filler. Preferably, the reinforcing aluminosilicate has a rate α which is greater than 1×10$^{-3}$ μm$^{-1}$/min (measured in the disagglomeration test at 100% power of a 600 W ultrasound probe). Such a characteristic guarantees for this type of product a very good ability firstly to be incorporated into the matrix during mixing with the elastomer and secondly to disagglomerate in order to disperse, in finely divided form, homogenously in the rubber matrix. For such a rate α greater than 1×10$^{-3}$ μm$^{-1}$/min, it was noted that few micronic agglomerates are observed by optical microscopy reflection on a section of rubber composition prepared in accordance with the rules of the art.

More preferably, in particular when the compositions of the invention are intended for tire treads having low rolling resistance and high wear resistance, the reinforcing aluminosilicates used satisfy at least one of the following characteristics, preferably both:

a BET surface area of between 60 and 200 m$^2$/g;
(or approximately between 120 and 800 m$^2$/cm$^3$ for the density range indicated above);
a particle size d$_w$ of between 100 and 200 nm.

Furthermore, for even better dispersibility of the reinforcing aluminosilicate in the diene rubber matrix, and therefore for optimum reinforcement, it is preferred that its disagglomeration rate a be greater than 2×10$^{-3}$ μm$^{-1}$/min.

The particles of reinforcing aluminosilicate furthermore have a high surface reactivity, that is to say a high number of surface hydroxyl functions (—OH) which are reactive with respect to the coupling agent, which is particularly favourable to the reinforcement function performed by the filler, and therefore to the mechanical properties of the rubber compositions of the invention.

Preferably, in the above formula (I), furthermore at least one, preferably all, of the following characteristics is/are satisfied:

x within a range from 0.01 to 2;
y within a range from 0.1 to 5;
a within a range from 0 to 5;
b within a range from 0 to 3;
c within a range from 0 to 5.

More preferably still, at least one, preferably all, of the following characteristics is/are satisfied:

x within a range from 0.05 to 1;
y within a range from 0.4 to 0.8;
a within a range from 2 to 4;
b within a range from 0 to 1;
c within a range from 0 to 1.

The physical state in which the reinforcing aluminosilicate may be present is immaterial, whether it be in the form of a powder, microbeads, granules, pellets, balls or any other densified form, provided, of course, that the mode of densification does not adversely affect the essential or preferred characteristics advocated for this filler.

The reinforcing aluminosilicate described above may be used on its own or associated with another reinforcing inorganic filler, for example a silica, in particular of HDS type. As non-limiting examples of silicas which can be used, mention may be made of the silicas Ultrasil 7000 and Ultrasil 7005 from Degussa, the silicas Zeosil 1165 MP, 1135MP and 1115MP from Rhodia, the silica Hi-Sil EZI50G from PPG, and the silicas Zeopol 8715, 8745 and 8755 from Huber. If a reinforcing alumina is used, this is preferably a highly dispersible alumina such as described in application EP-A-0 810 258 referred to above, for example the aluminas "Baikalox" "A125" or "CR125" (from Baikowski), "APA-100RDX" (from Condea), "Aluminoxid C" (from Degussa) or "AKP-G015" (Sumitomo Chemicals).

The reinforcing aluminosilicate, on its own or possibly associated with another reinforcing inorganic filler, may also be used in a blend, i.e. in a mixture, with one or more conventional tire-grade carbon blacks. Suitable carbon blacks are any carbon blacks, in particular the blacks of type HAF, ISAF and SAF, which are conventionally used in tires, and particularly in tire treads. As non-limitative examples of such blacks, mention may be made of the blacks N115, N134, N234, N330, N339, N347, N375.

The amount of carbon black present in the total reinforcing filler may vary within wide limits; it is preferably less than that of the reinforcing aluminosilicate. In the compositions of the invention, advantageously there is used, in association with the reinforcing aluminosilicate, a carbon black in a small proportion, in a preferred amount of between 2 and 20 phr, more preferably within a range from 5 to 15 phr (parts by weight per hundred parts of elastomer). Within the ranges indicated, there is a benefit to be had from the coloring properties (black pigmentation agent) and anti-UV properties of the carbon blacks, without furthermore adversely affecting the typical performance provided by the inorganic filler.

Preferably, the amount of total reinforcing filler in the compositions of the invention lies within a range from 20 to 400 phr, more preferably from 30 to 200 phr, as far as the amount of inorganic filler is also concerned. The optimum in fact differs according to the intended applications: in known manner, the level of reinforcement expected for a bicycle tire, for example, is distinctly lower than that required for a tire for a passenger vehicle or for a utility vehicle such as a heavy vehicle. When the compositions of the invention are intended for treads for tires, the amount of reinforcing inorganic filler, and therefore of reinforcing aluminosilicate when the latter constitutes the whole of this reinforcing inorganic filler, is selected to be preferably greater than 50 phr, for example between 50 and 150 phr.

II-3. Coupling Agent

It is well-known to the person skilled in the art that it is necessary to use, in the case of a reinforcing inorganic filler, a coupling agent also referred to as "bonding agent", the function of which is to provide the bond or "coupling" between the inorganic filler and the elastomer, while facilitating the dispersion of this inorganic filler within the elastomeric matrix.

The reinforcing aluminosilicate described previously also requires the use of such a coupling agent in order to perform its function of reinforcing filler in the rubber compositions according to the invention.

"Coupling agent" is more precisely understood to mean an agent capable of establishing a sufficient chemical and/or physical connection between the filler in question and the elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler;

X represents a functional group ("X" function) which is capable of bonding physically and/or chemically with the elastomer, for example by means of a sulphur atom;

T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any coupling agent likely to ensure the effective bonding or coupling between a reinforcing inorganic filler such as silica and a diene elastomer can be used, such as, for example, an organosilane, in particular a sulphurize alkoxysilane, or alternatively a polyorganosiloxane which is at least bifunctional (bearing the X and Y functions mentioned above).

Silica/elastomer coupling agents in particular have been described in a large number of documents, the best known being bifunctional alkoxysilanes such as sulphurized alkoxysilanes.

In particular sulphurized alkoxysilanes, which are referred to as "symmetrical" or "asymmetrical" depending on their specific structure, are used, such as those described for example in patent applications or patents U.S. Pat. Nos. 3,842,111, 3,873,489, 3,978,103, 3,997,581, 4,002,594, 4,072,701, 4,129,585, or in the more recent documents U.S. Pat. Nos. 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085, EP-A-1 043 357, WO 02/083782 which describe such known compounds in detail.

Particularly suitable for implementing the invention, without the definition below being limitative, are symmetrical polysulphurized alkoxysilanes which satisfy the following general formula (I):

$$Z-A-S_n-A-Z, \text{ in which} \qquad (I)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

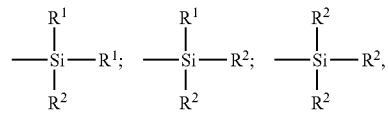

in which:

the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl), the radicals $R^2$, which may or may not be substituted, and may be identical or different, represent a $C_1$-$C_{18}$ alkoxyl group or a $C_5$-$C_{18}$ cycloalkoxyl group (preferably $C_1$-$C_8$ alkoxyl groups or $C_5$-$C_8$ cycloalkoxyl groups, more preferably $C_1$-$C_4$ alkoxyl groups, in particular methoxyl and/or ethoxyl).

In the case of a mixture of polysulphurized alkoxysilanes in accordance with Formula (I) above, in particular conventional, commercially available, mixtures, the average value of the "n"s is a fractional number, preferably between 2 and 5, more preferably close to 4. However, the invention may also be implemented advantageously for example with disulphurized alkoxysilanes (n=2).

As examples of polysulphurized alkoxysilanes, mention will be made more particularly of the polysulphides (in particular disulphides, trisulphides or tetrasulphides) of bis-(($C_1$-$C_4$)alkoxyl-($C_1$-$C_4$)alkyl-silyl($C_1$-$C_4$)alkyl), such as for example the polysulphides of bis(3-trimethoxysilylpropyl) or of bis(3-triethoxysilylpropyl) such as bis(3-triethoxysilylpropyl) tetrasulphide, abbreviated TESPT, of the formula [(C$_2$H$_5$O)$_3$Si(CH$_2$)$_3$S$_2$]$_2$ or bis(triethoxysilylpropyl) disulphide, abbreviated TESPD, of the formula [(C$_2$H$_5$O)$_3$Si(CH$_2$)$_3$S$_2$]$_2$, are used in particular.

TESPD is sold, for example, by Degussa under the name Si75 (in the form of a mixture of disulphide —75% by weight—and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

Mention will also be made as advantageous coupling agent of the polysulphides (in particular disulphides, trisulphides or tetrasulphides) of bis-(mono(C$_1$-C$_4$)alkoxyl-di (C$_1$-C$_4$)alkylsilylpropyl), more particularly bis-monoethoxydimethylsilylpropyl tetrasulphide as described in the aforementioned application WO02/083782.

As examples of coupling agents other than the aforementioned polysulphurized alkoxysilanes, mention will be made in particular of the bifunctional polyorganosiloxanes such as described for example in the aforementioned applications WO99/02602 or WO01/96442, or alternatively the hydroxysilane polysulphides such as described in the aforementioned applications WO02/30939 and WO02/31041.

The person skilled in the art will be able to adjust the content of coupling agent in the compositions of the invention, according to the intended application, the nature of the elastomer used and the quantity of reinforcing aluminosilicate, supplemented if applicable by any other inorganic filler used as complementary reinforcing filler.

So as to make allowance for the differences in specific surface area and density of the reinforcing aluminosilicates (and, if applicable, any other associated reinforcing inorganic fillers) which may be used, as well as the molar masses of the coupling agents, it is preferable to determine the optimum amount of coupling agent, in moles per meter squared of reinforcing inorganic filler, for each reinforcing inorganic filler (reinforcing aluminosilicate plus, if applicable, associated complementary inorganic filler) used; this optimum amount is calculated from the weight ratio [coupling agent/reinforcing inorganic filler], the BET surface area of the filler and the molar mass of the coupling agent (referred to as M hereafter), according to the following known equation:

(moles/m$^2$ inorganic filler)=[coupling agent/inorganic filler](1/BET)(1/M)

Preferably, the quantity of coupling agent used in the compositions according to the invention lies between 10$^{-7}$ and 10$^{-5}$ moles per m$^2$ of reinforcing inorganic filler, i.e. per m$^2$ of reinforcing aluminosilicate when the latter is used without another associated reinforcing inorganic filler. More preferably still, the quantity of coupling agent lies between 5×10$^{-7}$ and 5×10$^{-6}$ moles per m$^2$ of total inorganic filler (reinforcing aluminosilicate plus, if applicable, associated complementary inorganic filler).

Taking into account the quantities expressed above, the amount of coupling agent, reduced to the weight of diene elastomer, is preferably between 0.1 and 15 phr, more preferably between 0.5 and 10 phr.

The coupling agent used could be grafted beforehand (via the "X" function) on to the diene elastomer of the composition of the invention, the elastomer thus functionalized or "precoupled" then comprising the free "Y" function for the reinforcing aluminosilicate. The coupling agent could also be grafted beforehand (via the "Y" function) on to the reinforcing aluminosilicate, the filler thus "precoupled" then being able to be bonded to the diene elastomer by means of the free "X" functions. However, it is preferred to use the coupling agent inthe free (i.e.n on-grafted) state or grafted onto the reinforcing aluminosilicate, in particular for reasons of better processability of the compositions in the uncured state.

II-4. Various Additives

Of course, the compositions according to the invention contain, in addition to the compounds already described, all or some of the additives usually used in diene rubber compositions intended for the manufacture of tires, such as extender oils, plasticisers, pigments, protective agents of the type antioxidants, antiozonants, anti-fatigue agents, coupling activators such as described for example in the applications WO 00/05300, WO 00/05301, WO 01/55252, WO 01/55253, methylene acceptors and donors, bismaleimides or other reinforcing resins such as described for example in WO 02/10269, a cross-linking system based either on sulphur or on sulphur and/or peroxide donors, vulcanization accelerators, vulcanization activators, systems promoting adhesion of the rubber to the metal or textile, etc. There may also be associated with the reinforcing inorganic filler, if necessary, a conventional non-reinforcing white filler, such as for example clays, bentonite, talc, chalk or kaolin, in particular in rubber compositions intended for colored tires (see for example aforementioned application WO99/02590).

The rubber compositions according to the invention may also contain, in addition to the aforementioned coupling agents, agents (comprising for example the single Y function) for covering the reinforcing inorganic filler, or more generally processing aids liable, in known manner, owing to an improvement in the dispersion of the reinforcing inorganic filler in the rubber matrix and to a reduction in the viscosity of the compositions, to improve their processability in the uncured state, these agents, used, for example, in a preferred amount of between 0.5 and 3 phr, being, for example, alkylalkoxysilanes, (in particular alkyltriethoxysilanes, such as for example 1-octyl-triethoxysilane sold by Degussa-Hüls under the name Dynasylan Octeo, or 1-hexadecyl-triethoxysilane sold by Degussa-Hüls under the name Si216), polyols, polyethers (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

II-5. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature (T$_{max}$) of between 110° C. and 190° C., preferably between 130° C. and 180° C., followed by a second phase of mechanical working (sometimes referred to as "productive" phase) at lower temperature, typically less than 110° C., for example between 60° C. and 100° C., during which finishing phase the cross-linking or vulcanization system is incorporated; such phases have been described for example in the numerous aforementioned applications (for example WO 00/05300, WO 00/05301, WO 01/55252, WO 01/55253, WO 02/30939, WO 02/31041, WO 02/083782).

The manufacturing process according to the invention is characterized in that at least the reinforcing filler and the coupling agent are incorporated by kneading in the diene elastomer during the first, so-called non-productive, phase, that is to say that at least these different base constituents are introduced into the mixer and kneaded thermomechanically, in one or more stages, until a maximum temperature of between 110° C. and 190° C., preferably of between 130° C. and 180° C., is reached.

By way of example, the first (non-productive) phase is effected in a single thermomechanical stage during which all the base constituents necessary, any complementary covering agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (cooling temperature preferably less than 100° C.), with the aim of making the compositions undergo complementary heat treatment, in particular in order to improve further the dispersion, in the elastomeric matrix, of the reinforcing filler and its coupling agent. The total duration of the kneading, in this non-productive phase, is preferably between 2 and 10 minutes.

After cooling of the mixture thus obtained, the vulcanization system is then incorporated at low temperature, generally in an external mixer such as an open mill; the entire composition is then mixed (productive phase) for several minutes, for example between 5 and 15 minutes.

The final composition thus obtained is then calendered, for example in the form of a film or a sheet, in particular for characterization in the laboratory, or alternatively extruded, in order to form for example a rubber profiled element used for manufacturing semi-finished products such as treads, crown plies, sidewalls, carcass plies, beads, protectors, inner tubes or airtight internal rubbers for tubeless tires.

The vulcanization (or curing) is carried out in known manner at a temperature generally between 130° C. and 200° C., under pressure, for a sufficient time which may vary, for example, between 5 and 90 minutes, depending, in particular, on the curing temperature, the vulcanization system adopted, the vulcanization kinetics of the composition in question or alternatively the size of the tire.

The vulcanization system proper is preferably based on sulphur and a primary vulcanization accelerator, in particular an accelerator of the sulphenamide type. To this basic vulcanization system there are added, incorporated during the first, non-productive phase and/or during the productive phase, various known secondary accelerators or vulcanization activators such as zinc oxide, stearic acid, guanidine derivatives (in particular diphenylguanidine), etc. The sulphur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

It goes without saying that the invention relates to the rubber compositions previously described, both in the "uncured" state (i.e. before curing) and in the "cured" or vulcanized state (i.e. after cross-linking or vulcanization).

The compositions according to the invention may be used alone or in a blend (i.e. in a mixture) with any other rubber composition usable for manufacturing tires.

III. EXAMPLES OF EMBODIMENT OF THE INVENTION

III-1. Fillers Used

The characteristics of the aluminosilicates used in the following examples are set forth in Table 1.

Filler A is a conventional aluminosilicate (i.e., non-reinforcing), characterized in particular by a BET surface area and a particle size $d_w$ which are too high. The fillers B, C, D and E are reinforcing aluminosilicates, usable in the compositions according to the invention (characteristics a, b and c satisfied), synthesized in accordance with the indications of section III-2 below.

It will be noted that only the fillers B and C both satisfy all the preferred characteristics below:
BET of between 60 and 200 $m^2/g$;
$d_w$ between 100 and 200 nm;
rate α greater than $2\times10^{-3}$ $\mu m^{-1}/min$.

In everything which follows, the formula of the aluminosilicates has been determined in known manner, by inductively coupled plasma-atomic emission spectrometry ("ICP") as far as Na, K and Al are concerned, by thermogravimetric analysis (rate: 5° C./min) for the hydroxyl ions (loss of mass between 200 and 500° C.) and water (loss of mass between 20 and 200° C.), finally by spectrophotometric assay (visible range) for the element Si, after attack on the powder to be characterized by a concentrated acidic medium (mixture of 3 ml of 33% HCl, 1 ml of 70% HNO3 and 5 ml of 40% HF supplemented by 91 ml of distilled water).

III-2. Synthesis of the Fillers

A) Synthesis Filler B:

Filler B was synthesized in accordance with the operating method described in the publication "Acid and Alkaline Sol-Gel Synthesis of Amorphous Aluminosilicates, Dry Gel properties, and Their Use in Probing Sol Phase Reactions", B. M. De Witte and J. B. Uytterhoeven, Journal of Colloid and Interface Science 181, 200-207 (1996), as follows.

Equipment Used:
5-liter double-casing reactor;
Peristaltic pump (Masterflex L/S);
Thermostatically-controlled bath;
pH-meter (Mettler—Toledo MP225);
Centrifugal extractor (Rousselet—type RC30VxR);
Freeze-dryer (Christ Gamma 2-20);
Oven.

Precursors Used:
36% HCl (Prolabo Normapur);
$Na_2SiO_3$ (Strem Chemicals—reference 93-1196);
$NaAlO_2$ (Strem Chemicals—reference 93-1108).

Operating Method:
1440 g of a 1 mol/l HCl solution is introduced into a 5-liter reactor, provided with a double casing. The temperature of the medium is adjusted to 26° C. by a thermostatically-controlled bath connected to the double casing. The reaction medium is homogenised by a Teflon® stirrer having six faces, coupled to a motor rotating at a speed of 400 rpm.

Two solutions, referred to as sol. A and sol. B, are then prepared:
sol. A: 117.17 g of $Na_2SiO_3$ in 1,920 ml of bi-demineralized water;
sol. B: 39.31 g of $NaAlO_2$ in 960 ml of bi-demineralized water.

These two solutions are introduced simultaneously into the reactor, using two peristaltic pumps, at flow rates of 800 ml/min and 400 ml/min for sol. A and sol. B, respectively. Precipitation is instantaneous. At the end of introduction of the two solutions (after approximately 2 min 25 s), the pH of the suspension is equal to approximately 12.0 (or at the time t=0).

At the end of the time t=3 min 20 sec, 720 g of a solution of 1 mol/l HCl is introduced into the reactor using a peristaltic pump (flow rate 250 ml/min). The final pH of the suspension in the reactor is then 3.6. The heat regulation and the stirring of the mixture are maintained until the time t=2 h 06 min. The suspension is then centrifuged using the centrifugal extractor.

To form the cake, the suspension is introduced into the extractor (210 rpm) using a peristaltic pump (flow rate 400 ml/min). So as to lose only the minimum of product, the suspension obtained after the first passage is reintroduced twice into the extractor. The pH of the filtration water after the third passage is equal to 3.6.

For washing the cake, the rotation of the centrifuge is 210 rpm. The washing water is introduced at a flow rate of 300 ml/min. In total, 20 liters of water are used for the washing, the last lot of washing water having a pH of approximately 5.8. The final centrifuging takes place at 500 rpm.

The product thus obtained is then freeze-dried under the following conditions: 48 hours of main drying at −15° C. and 1030 mbar; then 12 hours of final drying at 0° C. in a dynamic vacuum. After freeze-drying, the product is crushed in a mortar and sieved (fraction of a size less than 425 μm). This product is then dried at 150° C. for 21 hours. The loss of mass is of the order of 13%.

There is thus obtained approximately 50 g of filler B, of formula:

$$Na_{0.05}SiAl_{0.5}O_{2.7}(OH)_{0.2}, (H_2O)_{0.3}$$

The $^{29}Si$ NMR analysis for this filler B reveals a chemical shift δ equal to −110 ppm, corresponding to a "Q4" silicon structure with 1 atom of aluminium, that is to say that there is at least one Si—O—Al bond for the majority of the silicon atoms.

B) Synthesis of Fillers C, D and E

Fillers C, D, and E are synthesized in known manner (see EP 692,452). The equipment used and precursors are identical to those of the preceding section, except that HCl is replaced by NaOH.

More precisely, the operating methods applied are as follows:

Filler C:

2830 ml of water and 48.94 g of NaOH are introduced into the 5-liter double-casing reactor. The temperature of the medium is adjusted to 26° C. The reaction medium is homogenised by a Teflon® stirrer having six faces, coupled to a motor rotating at a speed of 500 rpm.

Two solutions, sol. A and sol. B, are then prepared.
  sol. A: 159.46 g of $Na_2SiO_3$ in 935 ml of bi-demineralized water.
  sol. B: 26.64 g of $NaAlO_2$ in 300 ml of bi-demineralized water.

Using a funnel, sol. B is added into the reactor and vigorous stirring is maintained for 10 min (pH=13). Sol. A was added using a peristaltic pump, at a flow rate of 320 ml/min; precipitation is instantaneous. At the end of the introduction of sol. A (at the end of 2 min 45 sec), the pH of the suspension obtained is pH=13 (or at the time t=0).

The heat regulation and the stirring of the mixture are maintained until t=20 min (pH=13.2). The suspension is centrifuged using the centrifugal extractor.

To form the cake, the suspension is introduced into the extractor (500 rpm) using a peristaltic pump (flow rate 100 ml/min). The first pass is sufficient to recover the solid phase, the pH of the filtration water then being 11.5.

For washing the cake, the speed rotation of the centrifuge is 500 rpm. The washing water is introduced at a flow rate of 300 ml/min. In total, 35 liters of water are used for the washing, the last lot of washing water having a pH of approximately 8.2. The final centrifuging takes place at 500 rpm; this rotation is maintained until there is no more water on emerging from the tank; the product on emerging from the oven contains approximately 91% water.

It is then freeze-dried as previously for filler B, then crushed in a mortar and sieved (fractions of a size less than 425 μm), and finally dried at 150° C. (21 hours).

There is thus obtained approximately 50 g of filler C, of formula:

$$Na_{0.6}SiAl_{0.7}O_{3.1}(OH)_{0.3}, (H_2O)_{0.3}$$

Filler D:

Filler D is prepared like filler C above, apart from the following differences:
  sol. B: 53.22 g of $NaAlO_2$ in 300 ml of bi-demineralized water;
  10 min after the introduction of sol. B, pH=13.2;
  at the end of the introduction of sol. A (2 min 40 sec), pH=13.3 (t=0);
  the heat regulation and the stirring of the mixture are maintained until t=20 min 30 sec (pH=13.7);
  pH of the filtration water: 13.5;
  pH of the last lot of washing water: 7.6.

There is obtained approximately 50 g of filler D, of formula:

$$Na_{0.7}SiAl_{0.7}O_{3.2}(OH)_{0.3}, (H_2O)_{0.3}$$

Filler E:

Filler E is prepared like filler D above, apart from the following differences:
  KOH (68.28 g) replaces NaOH;
  10 min after the introduction of sol. B, pH=13.5;
  at the end of the introduction of sol. A (2 min 50 sec), the pH is equal to 13.3 (t=0);
  speed of rotation of the centrifuge (washing): 1000 rpm, flow rate of the peristaltic pump 50 m/min;
  pH of the filtration water: 13.7;
  pH of the last lot of washing water: 10.1;
  final drying at 1000 rpm;
  product on emerging from the tank contains 88% water.

There is thus obtained approximately 50 g of filler E, of formula:

$$Na_{0.5}SiAl_{0.7}O_{3.3}(OH)_{0.3}, (H_2O)_{0.5}$$

III-2. Preparation of the Compositions

The compositions tested hereafter are prepared in known manner, as follows: the diene elastomer (or the mixture of diene elastomers, if applicable) is introduced into an internal mixer filled to 75%, the initial tank temperature of which is approximately 90° C.; then, after an appropriate kneading time, for example of the order of 1 minute, all the other ingredients are added, including the filler and the associated coupling agent, with the exception of the vulcanization system. Thermomechanical working of a duration of about 10 minutes is then performed, with an average blade speed of 70 rpm, until a dropping temperature of about 160° C. is obtained.

The mixture thus obtained is recovered, it is cooled and then the vulcanization system (sulphur and sulphenamide-type primary accelerator) is added on an external mixer (homo-finisher) at 30° C., by mixing everything (productive phase) for a suitable time, of between 5 and 12 minutes depending on the case.

The compositions thus obtained are then calendered either in the form of plates (thickness of 2 to 3 mm) of rubber in order to measure their mechanical properties, or extruded in the form of tire treads. vulcanization (curing) is carried out at 150° C. for 40 min, under pressure.

In all the following tests, the reinforcing aluminosilicate is present, in the compositions according to the invention, in a preferred amount greater than 50 phr; it furthermore constitutes all or more than 90% by weight of the entire reinforcing filler, a minority fraction (less than 10%) of the latter possibly being formed by carbon black. In the compositions according to the invention, the amount of coupling agent is advantageously less than 5 phr.

III-3. Tests

A) Test 1

The aim of this test is to show that a conventional aluminosilicate, even in the presence of a high-performance coupling agent, cannot claim the title of a reinforcing inorganic filler.

For this, three compositions used for the manufacture of treads, none in accordance with the invention, are compared. The diene elastomer is an SBR prepared in solution (SSBR), comprising 25% by mass of styrene, the polybutadiene units present being 58% 1,2-polybutadiene units and 23% trans-1,4 polybutadiene units.

These three compositions are identical except for the following differences:
  composition C-1: silica (with coupling agent);
  composition C-2: filler A, without coupling agent;
  composition C-3: filler A, with coupling agent.

The HDS silica selected for the control composition C-1 is a tire-grade silica having in known manner a very high reinforcing ability ("Zeosil" type "1165MP" from Rhodia), used usually for reinforcing passenger-tire treads of low energy consumption.

In compositions C-2 and C-3, the aluminosilicate is used in an equal-volume fraction of filler (same volume of filler in each of the compositions) relative to the composition C-1. The TESPT coupling agent and the DPG covering agent were introduced with equal coverage, taking into account the density and the BET surface area of the inorganic fillers used, relative to the control composition.

Tables 2 and 3 show in succession the formulation of the different compositions (Table 2—amount of the different products expressed in phr), and their properties before and after curing at 150° C. for 40 minutes (Table 3). FIG. 1 shows the curves of true secant modulus "M" (in MPa) as a function of the elongation (in %); these curves are marked C1 to C3, and correspond to rubber compositions C-1 to C-3 respectively.

A study of the different results shows that compositions C-2 and C-3 based on aluminosilicate after curing have a level of reinforcement which is very distinctly lower than that of the control composition C-1 based on HDS silica: breaking stress approximately six times lower, moduli at the high deformations (M100 and M250) very distinctly lower, measurement of "bound rubber" impossible owing to crumbled compositions, all clear indicators to the person skilled in the art of a poor level of reinforcement for the two compositions based on the conventional aluminosilicate.

The attached FIG. 1 confirms the above results: it will be noted that curves C2 and C3 are located very much below the control curve C1; this clearly illustrates a very low level of reinforcement, whether the coupling agent be present or not, very distinctly less than that expected of a true reinforcing inorganic filler such as an HDS silica (curve C1).

B) Test 2

The aim of this second test is to show that a reinforcing aluminosilicate such as described above can on the contrary claim the title of a reinforcing inorganic filler.

For this, two diene rubber compositions usable for the manufacture of tires, in particular of treads for passenger-car tires, are compared. The diene elastomer is an SBR prepared in solution (SSBR), comprising 25% by mass of styrene, the polybutadiene units present being 58% 1,2-polybutadiene units and 23% trans-1,4 polybutadiene units.

These two compositions are identical except for the following differences:
  composition C-4 (control): HDS silica with TESPT coupling agent;
  composition C-5 (according to the invention): filler B, with TESPT coupling agent.

In composition C-5, the coupling agent was introduced at a rate of surface coverage substantially equivalent to that selected for the preceding composition C-3 (namely approximately $9.5 \times 10^{-7}$ mol/m$^2$ of aluminosilicate); the quantity of coupling agent used is greater to make allowance for the larger BET surface area of the reinforcing aluminosilicate tested here. The control composition C-4 is conventionally filled with HDS silica, similar to composition C—1 of the previous test.

Figure 2:
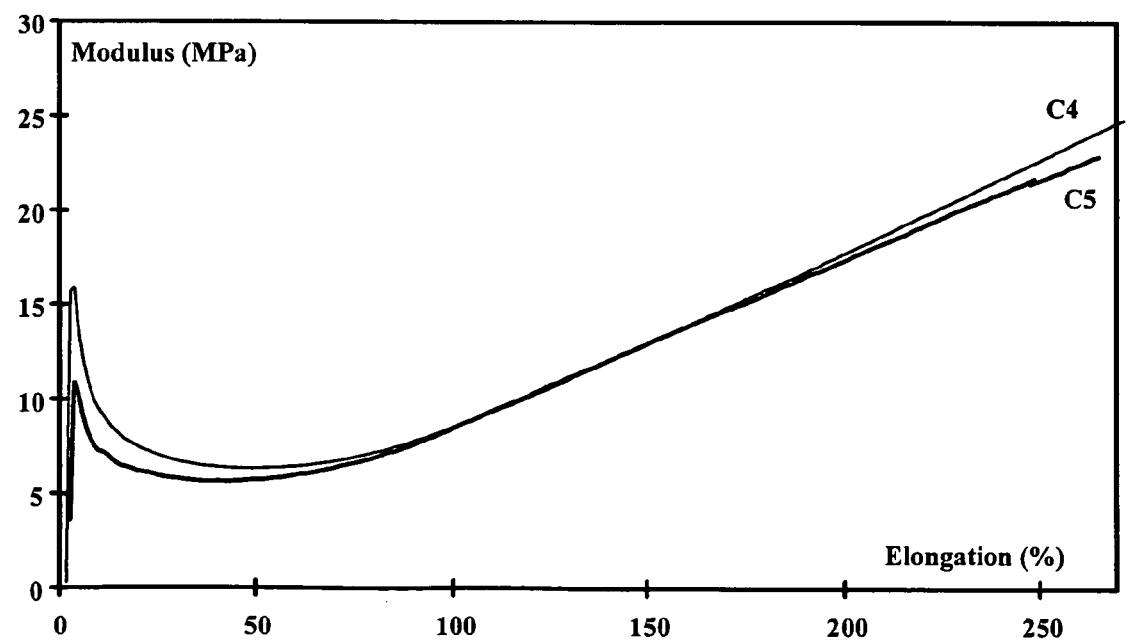
FIG. 2 is a graph showing the curves of modulus "M" as a function of the elongation for rubber compositions C-4 and C-5.

Tables 4 and 5 show the formulation of the different compositions (Table 4—amount of the different products expressed in phr), and their properties after curing at 150° C. for 40 minutes (Table 5). FIG. 2 shows the curves of modulus "M" (in MPa) as a function of the elongation (in %); these curves are marked C4 and C5, and correspond to compositions C-4 and C-5 respectively.

A study of the results of Table 5 shows that the composition of the invention has, after curing, a level of reinforcement equivalent to that of the control composition, with equivalent moduli, in particular at high deformations (M100 and M250), a ratio M250/M100 which is identical, identical measurements in the "bound rubber" test, all indications of reinforcement well-known to the person skilled in the art which demonstrate the remarkable reinforcing activity of filler C, in the presence of the coupling agent. FIG. 2 confirms these results, with curves C4 and C5 which appear to virtually coincide.

C) Test 3

Here 4 other rubber compositions are compared, the elastomer being an SSBR identical to that used for Test 1 above.

These 4 compositions are distinguished by the nature of the reinforcing inorganic filler used:
  composition C-6 (control): HDS silica;
  composition C-7: filler C;
  composition C-8: filler D;
  composition C-9: filler E.

In compositions C-7, C-8 and C-9, all in accordance with the invention, the TESPT coupling agent was introduced at a rate of surface coverage substantially equivalent to that selected for the preceding composition C-3; of course, the quantity of coupling agent used is greater to make allowance for the larger BET surface area of the reinforcing aluminosilicate tested here. The control composition C-6 is similar to the composition C-1 of the previous test.

Tables 6 and 7 show in succession the formulation of the different compositions, and their properties before and after curing at 150° C. (40 min).

It will be noted that the compositions according to the invention, compared with the control composition, are characterized first of all by a narrow range of ratios of moduli (M250/M100) and a lower hysteresis ($\tan(\delta)_{max}$), all indications of reinforcement which are known to the person skilled in the art which demonstrate the unexpected reinforcing ability of the aluminosilicates tested.

On the other hand, equally unexpectedly, it will be observed that all the compositions according to the invention C-7 to C-9 have rheometric properties ($T_{99}$ and K) which are improved compared with the control C-6; thus, on compositions C-7 and C-9, the curing rate (K) is in practice increased by a factor of two.

Finally, it is noted that the composition C-7, which has the best overall compromise in terms of reinforcement and of curing kinetics, is the one reinforced with the aluminosilicate (filler C) which satisfies in combination the most preferred characteristics of BET surface area (between 60 and 200 m²/g), size $d_w$ (between 100 and 200 nm) and disagglomeration rate α (greater than $2 \times 10^{-3}$ μm$^{-1}$/min).

In conclusion, the specific synthetic aluminosilicates of the compositions according to the invention impart to the latter a new advantageous compromise of properties, in terms of reinforcement and of curing kinetics, compared with a conventional reinforcing inorganic filler such as an HDS silica.

The invention can thus be applied preferably in rubber compositions intended for the manufacture of treads for tires which have both low rolling resistance and high wear resistance, in particular when these treads are intended for tires for passenger vehicles or for industrial vehicles of the heavy-vehicle type.

TABLE 1

| | filler: | | | | |
|---|---|---|---|---|---|
| | A | B | C | D | E |
| density He (g/cm³) | 2.64 | 2.24 | 2.34 | 2.33 | 2.34 |
| BET surface area (m²/g) | 407 | 156 | 99 | 54 | 115 |
| BET surface area (m²/cm³) | 1075 | 349 | 232 | 126 | 269 |
| $d_w$ (nm) | 2030 | 179 | 117 | 247 | 92 |
| □ (μm⁻¹/min) | — | 6.8 × 10⁻³ | 2.3 × 10⁻³ | 9.3 × 10⁻³ | 1.8 × 10⁻³ |

TABLE 2

| | Composition No. | | |
|---|---|---|---|
| | C-1 | C-2 | C-3 |
| SSBR (1) | 100 | 100 | 100 |
| HDS silica | 52.5 | — | — |
| filler A | — | 66 | 66 |
| coupling agent (2) | 4.2 | — | 13.45 |
| carbon black (N330) | 6 | 6 | 6 |
| ZnO | 2.5 | 2.5 | 2.5 |
| stearic acid | 2 | 2 | 2 |
| antioxidant (3) | 1.9 | 1.9 | 1.9 |
| DPG (4) | 1.05 | 3.35 | 3.35 |

TABLE 2-continued

| | Composition No. | | |
|---|---|---|---|
| | C-1 | C-2 | C-3 |
| sulphur | 1 | 1 | 1 |
| accelerator (5) | 2 | 2 | 2 |

(1) Solution SBR extended with 37.5% of aromatic oil (or 37.5 phr of oil per 100 phr of dry SBR); Tg = −25° C. measured on dry SBR;
(2) TESPT ("Si69" from DEGUSSA-HÜLS);
(3) N-1,3-dimethylbutyl-N-phenylparaphenylenediamine ("Santoflex 6-PPD" from Flexsys);
(4) Diphenylguanidine ("Vulcacit D" from Bayer).
(5) N-cyclohexyl-2-benzothiazylsulphenamide ("Santocure CBS" from Flexsys).

TABLE 3

| | Composition No. | | |
|---|---|---|---|
| | C-1 | C-2 | C-3 |
| M10 (MPa) | 8.5 | 7.0 | 6.5 |
| M100 (MPa) | 6.5 | 3.1 | 5.0 |
| M250 (MPa) | 17.7 | 3.0 | 5.1 |
| M250/M100 | 2.75 | 0.96 | 1.02 |
| breaking stress (MPa) | 19.7 | 3.0 | 3.8 |
| elongation at break (%) | 350 | 809 | 311 |
| "Bound rubber" (%) | 34 | (*) | (*) |

(*) measurement impossible (composition crumbled)

TABLE 4

| | Composition No. | |
|---|---|---|
| | C-4 | C-5 |
| SSBR (1) | 100 | 100 |
| HDS silica | 52.5 | — |
| filler B | — | 56.5 |
| coupling agent (2) | 4.2 | 4.4 |
| carbon black (N330) | 6 | 6 |
| ZnO | 2.5 | 2.5 |
| stearic acid | 2 | 2 |
| antioxidant (3) | 1.9 | 1.9 |
| DPG (4) | 1.0 | 1.0 |
| Sulphur | 1.5 | 1.5 |
| accelerator (5) | 2.5 | 2.5 |

(1) to (5): idem Table 2.

TABLE 5

| | Composition No. | |
|---|---|---|
| | C-4 | C-5 |
| M10 (MPa) | 9.6 | 6.9 |
| M100 (MPa) | 8.5 | 8.3 |
| M250 (MPa) | 22.7 | 22.1 |
| M250/M100 | 2.66 | 2.67 |
| "Bound rubber" (%) | 21.5 | 22.9 |

TABLE 6

| | Composition No. | | | |
|---|---|---|---|---|
| | C-6 | C-7 | C-8 | C-9 |
| SSBR (1) | 100 | | | 100 |
| silica | 52.5 | — | — | — |
| filler C | — | 58.5 | — | — |

TABLE 6-continued

| | Composition No. | | | |
|---|---|---|---|---|
| | C-6 | C-7 | C-8 | C-9 |
| filler D | — | — | 58.3 | — |
| filler E | — | — | — | 58.5 |
| coupling agent (2) | 4.2 | 2.9 | 1.6 | 3.4 |
| ZnO | 2.5 | 2.5 | 2.5 | 2.5 |
| stearic acid | 2 | 2 | 2 | 2 |
| antioxidant (3) | 1.9 | 1.9 | 1.9 | 1.9 |
| DPG (4) | 1.0 | 0.7 | 0.4 | 0.8 |
| sulphur | 1.5 | 1.5 | 1.5 | 1.5 |
| accelerator (5) | 2.5 | 2.5 | 2.5 | 2.5 |

(1) to (5): idem Table 4.

TABLE 7

| | Composition No. | | | |
|---|---|---|---|---|
| | C-6 | C-7 | C-8 | C-9 |
| ME10 (MPa) | 8.6 | 8.0 | 5.9 | 7.7 |
| ME100 (MPa) | 9.2 | 8.8 | 7.4 | 9.2 |
| ME250 (MPa) | 24.8 | 22.5 | 17.3 | 20.8 |
| ME250/ME100 | 2.9 | 2.8 | 3.0 | 2.7 |
| $T_{99}$ (min) | 34.3 | 15.3 | 22.8 | 13.4 |
| $\alpha$ min$^{-1}$ | 0.179 | 0.362 | 0.249 | 0.333 |
| K (relative units) | 100 | 202 | 139 | 186 |
| $\tan(\delta)_{max}$ | 0.287 | 0.245 | 0.211 | 0.204 |

The invention claimed is:

1. A rubber composition comprising at least one diene elastomer, one reinforcing inorganic filler, and a coupling agent providing a bond between the inorganic filler and the elastomer, wherein the inorganic filler comprises a synthetic aluminosilicate of the formula:

$$M_xSiAl_yO_a(OH)_b, (H_2O)_c \qquad (I)$$

where:
M is a cation selected from the group consisting of K$^+$, Na$^+$, Ca$^{++}$ and mixtures of these cations;
x>0; y>0; a≧0; b≧0, c≧0 and a+b>0;
and having the following characteristics:
  (a) a BET specific surface area of between 20 and 300 m$^2$/g;
  (b) an average particle size by mass (d$_w$) of between 20 and 400 nm;
  (c) an ultrasound disagglomeration rate ($\alpha$) greater than $5 \times 10^{-4}$ µm$^{-1}$/min.

2. The composition according to claim 1, wherein the diene elastomer is selected from the group consisting of polybutadienes, synthetic polyisoprenes, natural rubber, butadiene/styrene copolymers, butadiene/isoprene copolymers, butadiene/acrylonitrile copolymers, isoprene/styrene copolymers, butadiene/styrene/isoprene copolymers and mixtures of these elastomers.

3. The composition according to claims 1, wherein the coupling agent comprises a silane or a polysiloxane which is at least bifunctional.

4. The composition according to claim 1, wherein formula (I) satisfies at least one of the following characteristics:
  x within a range from 0.01 to 2;
  y within a range from 0.1 to 5;
  a within a range from 0 to 5;
  b within a range from 0 to 3;
  c within a range from 0 to 5.

5. The composition according to claim 4, wherein formula (I) satisfies all of the following:
  x within a range from 0.01 to 2;
  y within a range from 0.1 to 5;
  a within a range from 0 to 5;
  b within a range from 0 to 3;
  c within a range from 0 to 5.

6. A composition according to claim 1, wherein the amount of reinforcing aluminosilicate is greater than 50 phr.

7. The composition according to claim 1, wherein the BET surface area is between 40 and 250 m$^2$/g.

8. The composition according to claim 1, wherein the size d$_w$ is between 50 and 300 nm.

9. The composition according to claim 1, wherein the rate $\alpha$ is greater than $1 \times 10^{-3}$ µm$^{-1}$/min.

10. The composition according to claim 8, wherein the reinforcing aluminosilicate satisfies at least one of the following characteristics:
  its BET surface area is between 60 and 200 m$^2$/g;
  its particle size d$_w$ is between 100 and 200 nm.

11. The composition according to claim 10, wherein the reinforcing aluminosilicate satisfies both of the following characteristics:
  its BET surface area is of between 60 and 200 m$^2$/g;
  its particle size d$_w$ is between 100 and 200 nm.

12. The composition according to claim 9, wherein the rate $\alpha$ is greater than $2 \times 10^{-3}$ µm$^{-1}$/min.

13. A process for preparing a rubber composition usable for the manufacture of tires, said composition comprising at least (i) one diene elastomer, at least (ii) one reinforcing inorganic filler, and (iii) a coupling agent providing a bond between the inorganic filler and the elastomer, said inorganic filler comprising a synthetic aluminosilicate of the formula:

$$M_xSiAl_yO_a(OH)_b, (H_2O)_c \qquad (I)$$

where:
M is a cation selected from the group consisting of K$^+$, Na$^+$, Ca$^{++}$ and mixtures of these cations;
x>0; y>0; a≧0; b≧0, c≧0 and a+b>0;
and having the following characteristics:
  (a) a BET specific surface area of between 20 and 300 m$^2$/g;
  (b) an average particle size by mass (d$_w$) of between 20 and 400 nm;
  (c) an ultrasound disagglomeration rate ($\alpha$) greater than $5 \times 10^{-4}$ µm$^{-1}$/min, said process comprising kneading said composition thermomechanically, in one or more stages, until a maximum temperature of between 110° C. and 190° C. is reached.

14. A method of reinforcing a diene rubber composition, which comprises adding thereto a synthetic aluminosilicate of the formula:

$$M_xSiAl_yO_a(OH)_b, (H_2O)_c \qquad (I)$$

where:
M is a cation selected from the group consisting of K$^+$, Na$^+$, Ca$^{++}$ and mixtures of these cations;
x>0; y>0; a≧0; b≧0, c≧0 and a+b>0;
and having the following characteristics:
  (a) a BET specific surface area of between 20 and 300 m$^2$/g;
  (b) an average particle size by mass (d$_w$) of between 20 and 400 nm;
  (c) an ultrasound disagglomeration rate ($\alpha$) greater than $5 \times 10^{-4}$ µm$^{-1}$/min.

15. A rubber article manufactured from the composition according to claim 1.

16. A semi-finished product for tires, comprising a rubber composition according to claim 1, selected from treads, underlayers for treads, crown plies, sidewalls, carcass plies, beads, protectors, inner tubes or airtight internal rubbers for tubeless tires.

17. A tire comprising a rubber composition according to claim 1.

18. A tire tread comprising a rubber composition according to claim 1.

* * * * *